US005744774A

United States Patent [19]

Levinson et al.

[11] Patent Number: 5,744,774

[45] Date of Patent: Apr. 28, 1998

[54] METHOD AND APPARATUS FOR AFFIXING A DEVICE TO A MULTICONDUCTOR CABLE

[75] Inventors: Jack Levinson, Boulder; Kirk L. Weimer, Superior; Todd G. Wieseler, Boulder, all of Colo.

[73] Assignee: Ohmeda Inc., Liberty Corner, N.J.

[21] Appl. No.: 624,069

[22] Filed: Mar. 29, 1996

[51] Int. Cl.[6] .................... B23K 11/26

[52] U.S. Cl. .................... 219/56.1

[58] Field of Search .................... 219/56, 56.1, 56.21; 140/111, 112

[56] References Cited

U.S. PATENT DOCUMENTS

| | | | |
|---|---|---|---|
| 3,789,183 | 1/1974 | Conley | 219/86 |
| 4,326,115 | 4/1982 | Bartholet et al. | 219/56.1 |
| 4,899,029 | 2/1990 | Kumagai | 219/56.1 |

*Primary Examiner*—Matthew V. Nguyen
*Attorney, Agent, or Firm*—William A. Schoneman; Roger M. Rathbun; Salvatore P. Pace

[57] ABSTRACT

A single multifunction fixture secures an electronic device in a predetermined position and provides guide slots for the worker to place the individual conductors of a multiconductor cable in place such that each conductor aligns with a corresponding contact on the device when both the cable and the device are secured in the fixture. The fixture includes a movable head that can be brought into contact with the conductors once they are positioned over the corresponding electrical contacts to form electrically conductive paths through the head, electrical conductor, device contact and fixture for each of the cable conductors. The electrically conductive paths through the fixture form high current carrying capacity paths which, when sufficient current is passed therethrough, function to weld the cable conductors to their corresponding electrical contact on the device.

10 Claims, 6 Drawing Sheets

METHOD AND APPARATUS FOR AFFIXING A DEVICE TO A MULTICONDUCTOR CABLE

FIELD OF THE INVENTION

This invention relates to the manufacture of monitoring probes, and, in particular, to both a method and an apparatus for mechanically and electrically affixing electronic devices to the conductors of a multiconductor cable.

PROBLEM

It is a problem in the field of monitoring probe manufacture to efficiently interconnect an electronic device to the conductors of a multiconductor cable. A monitoring probe typically includes a plurality of devices, each of which must be electrically interconnected with a multiconductor cable. There are numerous industry standard and proprietary designs for device-conductor interconnection, each of which is adapted to address certain constraints that relate to the application in which the device is used. Despite this diversity of device designs, the one thing all devices have in common is that workers must install the device on the multiconductor cable. The installation process includes separating the individual conductors from the bundle of conductors contained in the cable, piercing and removing the insulation that covers the end of this selected conductor, then electrically interconnecting the conductor with a corresponding electrical contact on the device, and mechanically securing the conductor and the cable to the device to prevent damage to the electrical connection due to mechanical forces applied to the cable. The process of mechanically securing and electrically interconnecting each conductor of the cable to the device is labor intensive and, therefore, the resultant cable has a cost that is driven by the labor required to produce the connectorized cable. Numerous device designs have been realized to simplify the manufacturing process but each of the presently available schemes require the worker to manually place each conductor seriatim in place on its corresponding electrical contact and solder the end of the conductor to the electrical contact. This conductor-by-conductor process is typically repeated to also mechanically secure each of the plurality of conductors to the device.

Thus, there presently does not exist a device design and a method of interconnecting the device to a multiconductor cable that significantly impacts on the labor content required to produce the resultant probe.

SOLUTION

The above described problems are solved and a technical advance achieved in the field by the apparatus and method of affixing a device to a multiconductor cable of the present invention. In the preferred embodiment of the invention, a single multifunction fixture is used in the manufacturing process. This fixture functions to secure the device in a predetermined position and to provide guide slots for the worker to place the individual conductors of the cable in place such that each conductor aligns with a corresponding contact on the device when both the cable and the device are positioned in the fixture. The design of the fixture is such that the plurality of conductors are positioned to precisely align the conductors with their corresponding electrical contacts on the device and to reduce any mechanical stress that is placed on the junctions between these elements when the device is assembled. Furthermore, the fixture includes a movable head that can be brought into contact with the conductors once they are positioned over the corresponding electrical contacts of the device. Conductor paths exist in the fixture and on the movable head to form electrically conductive paths through the head, electrical conductor, device contact and fixture for each of the device contacts. This plurality of electrically conductive paths through the fixture form high current carrying capacity paths which, when sufficient current is passed therethrough, function to weld each of the cable conductors to their corresponding electrical contact on the device. By placing the movable head in contact with the conductors and device secured in the fixture, and passing the electrical current through each of these plurality of parallel oriented welding paths, all of the conductors can individually be welded to their corresponding electrical contact on the device, thereby both mechanically and electrically interconnecting the cable to the device. The use of the single fixture to form the mechanical and electrical interconnection of the cable conductors to the device contacts, the labor content required to manufacture the cabled device is drastically reduced from that typically achieved using existing state of the art cable-device assembly techniques.

The single fixture of the device assembly apparatus of the present invention thereby serves to significantly reduce the labor content required to assemble an attached cable by implementing the mechanical and electrical interconnection steps. The single fixture also functions to precisely align the individual conductors of the cable with their corresponding electrical contacts of the device to thereby minimize the strain that can be placed on any individual conductor contact junction.

DETAILED DESCRIPTION

Overall Architecture

Figure 1:
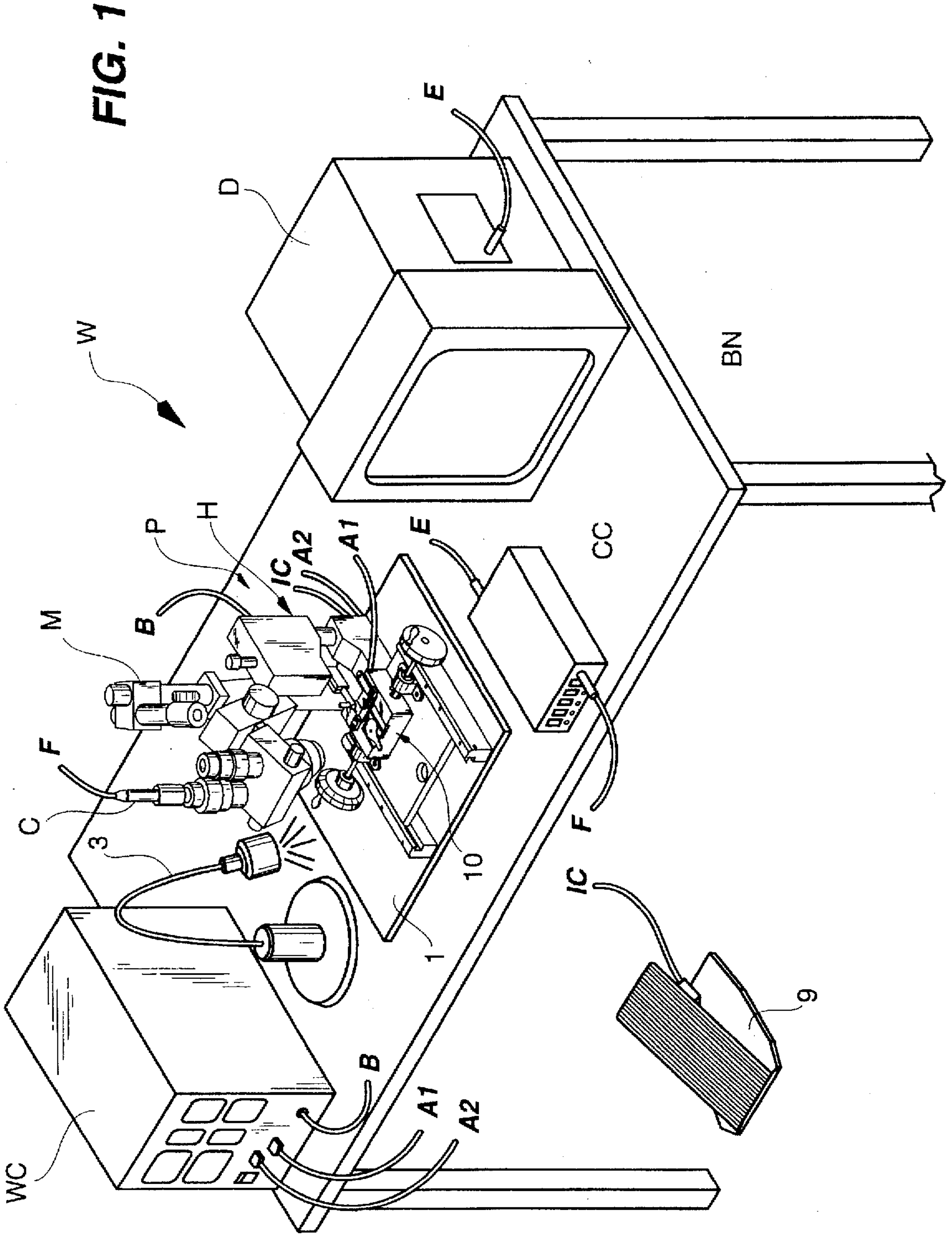
FIG. 1 illustrates a perspective view of the connector assembly apparatus of the present invention.

FIG. 1 illustrates a perspective view of the device assembly apparatus of the preferred embodiment of the present invention (herein termed wire welding fixture W) which is used to assemble a device-cable combination, also termed an attached cable. This wire welding fixture W consists of a single fixture which functions to secure and position the various elements that must be interconnected in the device assembly process.

The wire welding fixture W is typically mounted on a workstation bench BN as shown in FIG. 1. The wire welding fixture W comprises a number of elements, which are characterized by the following general catalog description to illustrate their general interrelationship. The primary section P of the wire welding fixture W is substantially centrally located since it is the element which the worker uses to assemble the attached cable. A source of light, such as lamp 3 is typically included to illuminate the work area for the benefit of the worker present at the wire welding fixture W. A foot pedal 9 is shown located under the workbench BN, and a video display monitor D, camera control CC and weld power supply WC are placed on the work surface of the workbench BN. The primary section P of the wire welding fixture W includes a microscope fixture M with camera C, which is used to view the work piece in magnified detail.

Figure 5:
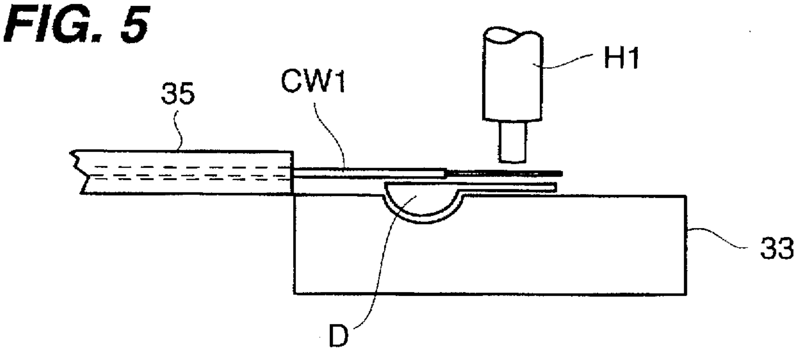
FIG. 5 illustrates additional details of the work fixture of FIG. 3, wherein a multiconductor cable is inserted into this work fixture.

The precise positioning of the conductors in the work fixture 10 is facilitated by the use of camera C which is connected by conductors F to the camera control CC. The image produced by the camera C is transmitted via camera control CC to the display device D so that the worker can view an enlarged image of the work piece that is present in the work fixture 10 for welding. The apparatus which embodies the primary section P of the wire welding fixture W also includes a movable welding head H which can be moved in a downward direction to a position juxtaposed to the work fixture 10 from its initial position which is illustrated in FIG. 1. The anode of the wire welding fixture W is part of the work fixture 10 while the cathode comprises a single prong apparatus of welding head H shown in FIG. 5, which is electrically connected to weld power supply WC by conductors A2. The worker moves the weld cathode down to align with the elements to be welded. The worker then operates the foot pedal 9 to move the weld cathode down into position, completing the electrical circuit of the weld circuit and building up head pressure to fire the welder. This configuration of equipment which implements the preferred embodiment of the wire welding fixture W of the present invention is simply illustrative and many other configurations are possible and even contemplated within the context of the following description.

Primary Section

Figure 2:
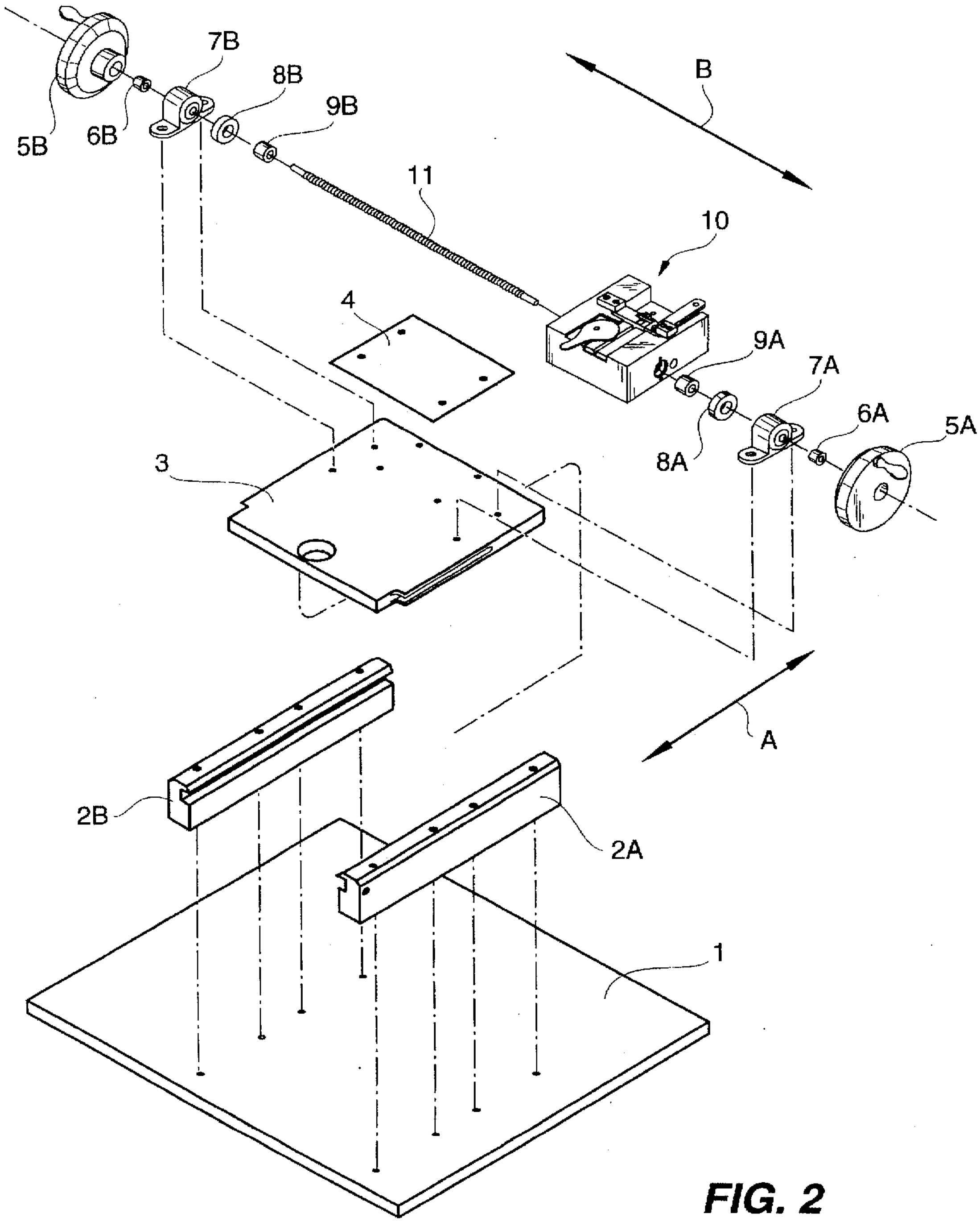
FIG. 2 illustrates a partially exploded perspective view of the electronic device assembly apparatus, including the work fixture used in the preferred embodiment of the invention.

FIG. 2 illustrates a partially exploded view of a portion of the primary element P of the wire welding fixture W. The base plate 1 implements a substantially planar surface on which the various elements that comprise the primary section P of the wire welding fixture W are mounted. In particular, a pair of guide rail mounts 2A, 2B are mounted on the base plate 1 in a parallel-oriented spaced apart relationship to thereby form a set of rails on which the mounting plate 3 can move in a lateral direction, shown by arrow A in FIG. 2. The work fixture 10 is placed on shim plate 4, which is affixed to mounting plate 3. The work fixture 10 is movable in only one direction, perpendicular to direction A as shown by arrow B on FIG. 2. The movement of work fixture 10 is effected by means of the lead screw 11 which mates with the two lead screw nuts 9A, 9B which are each mounted in a respective end of the hole formed in the base of the work fixture 10. The lead screw 11 is rotated by either of the knobs 5A, 5B, one of which is mounted at either end of the lead screw 11. The lead screw 11 is also inserted through the two pillow blocks 7A, 7B, which are rigidly mounted on the mounting plate 3. Collars 6A, 6B and nut brackets 8A, 8B are also provided in well known fashion to interconnect the lead screw 11 with the pillow blocks 7A, 7B. Thus, the worker rotates either of knobs 5A, 5B to cause the lead screw 11 to rotate within the pillow blocks 7A, 7B. The lead screw nuts 9 mounted in the base of the work fixture 10 translate the lead screw 11 rotation to a lateral displacement of the work fixture 10 in direction B between the bounding pillow blocks 7A, 7B, with the direction of lateral displacement being a function of the direction of rotation of the knobs 5A, 5B. Thus, the worker can move the work fixture 10 in a first direction by operation of the knobs 5A, 5B and in a second direction, perpendicular to the first direction, by sliding the mounting plate 3 in direction A along the tracks formed by the guide rail mounts 2A, 2B.

Work Fixture

Figure 3:
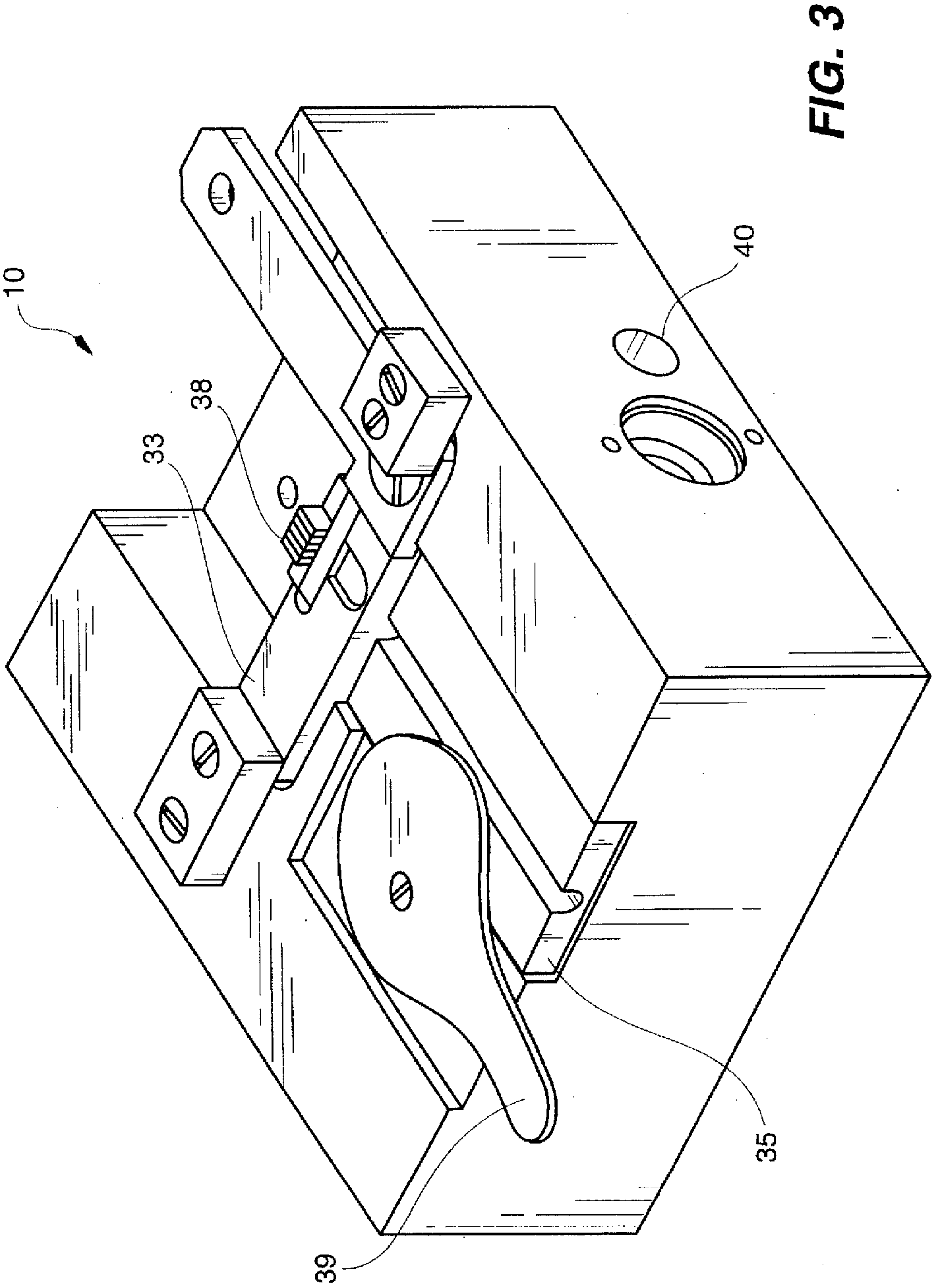
FIG. 3 illustrates a perspective view of the work fixture used in the preferred embodiment of the invention.
Figure 4:
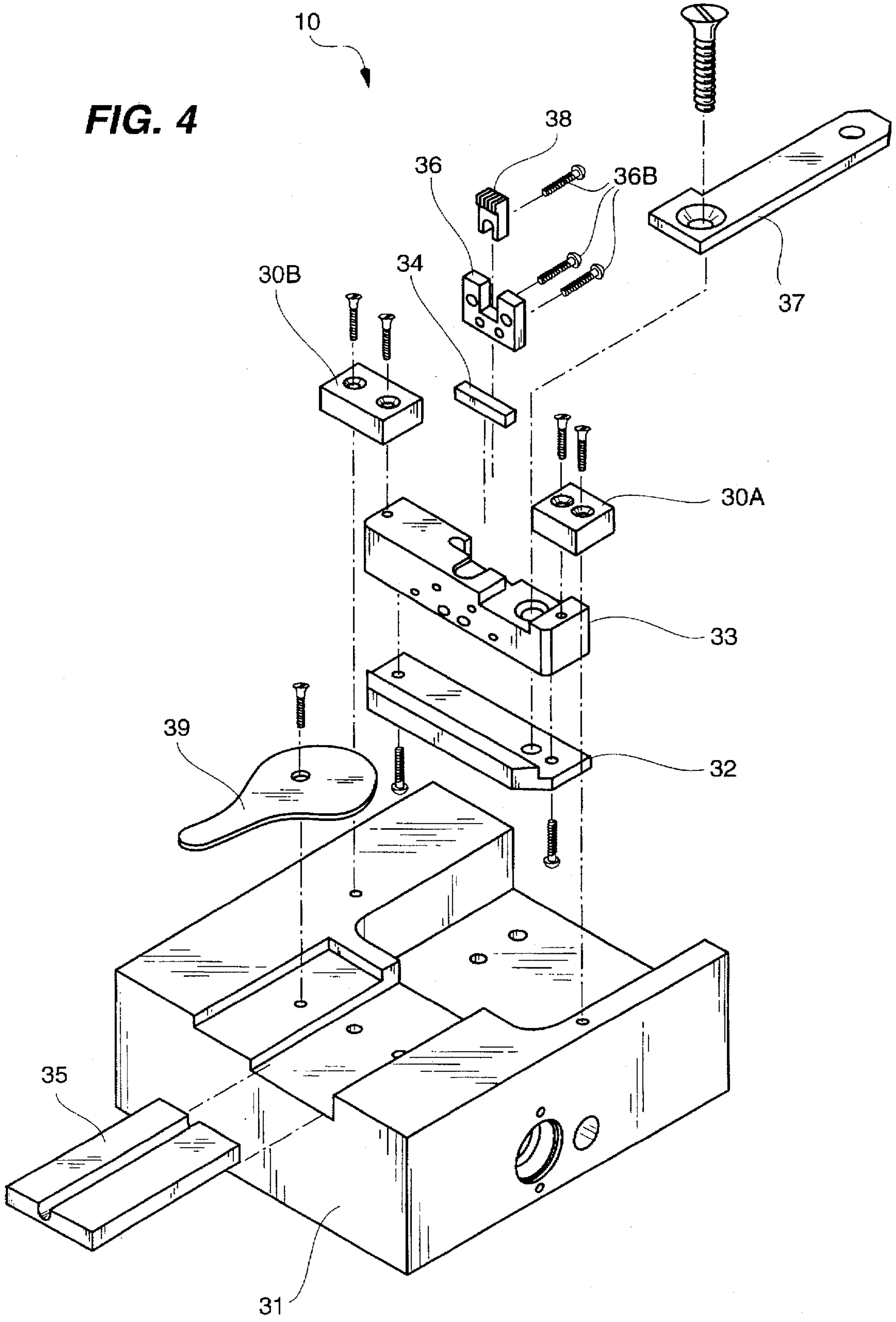
FIG. 4 illustrates an exploded view of the work fixture used in the preferred embodiment of the invention.

FIG. 3 illustrates a perspective view and FIG. 4 illustrates an exploded perspective view of the work fixture 10. The work fixture 10 consists of a base unit 31 which serves as the foundation upon which the various pieces of the work fixture 10 are secured in place. Anode 33 is mounted to provide a conductive path to the electronic device's electrical contacts also called "traces". A rectangular weld rod 34 is secured against one face of the anode 33 and forms the common electrical contact that contacts the electrical traces of the electronic device. Rod clamp 36 is used to secure the weld rod in place via screws 36*b*. Finally, anode comb 38 is bolted via bolt 36*b* in place in the aperture formed in rod clamp 36. The anode base 32 is connected to the anode 33 and functions to provide insulation to the fixture base 31. Guide 35 includes a recess formed therein to receive the multiconductor cable and lever 39 is eccentrically oriented to hold the multiconductor cable in place in the recess in guide 35 when operated.

Device Assembly Process

Figure 7:
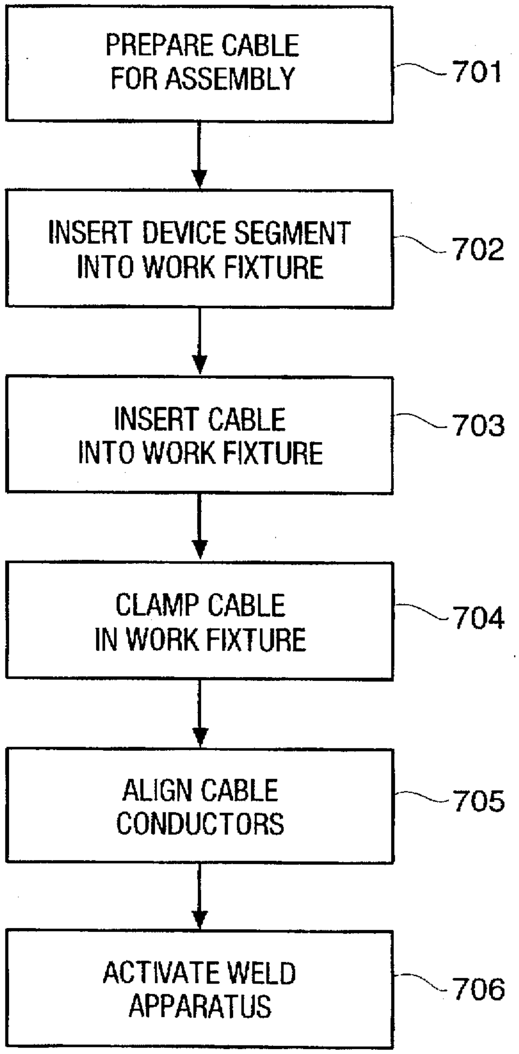
FIG. 7 illustrates in flow diagram form the operational steps taken to assemble the device and associated cable.
Figure 6:
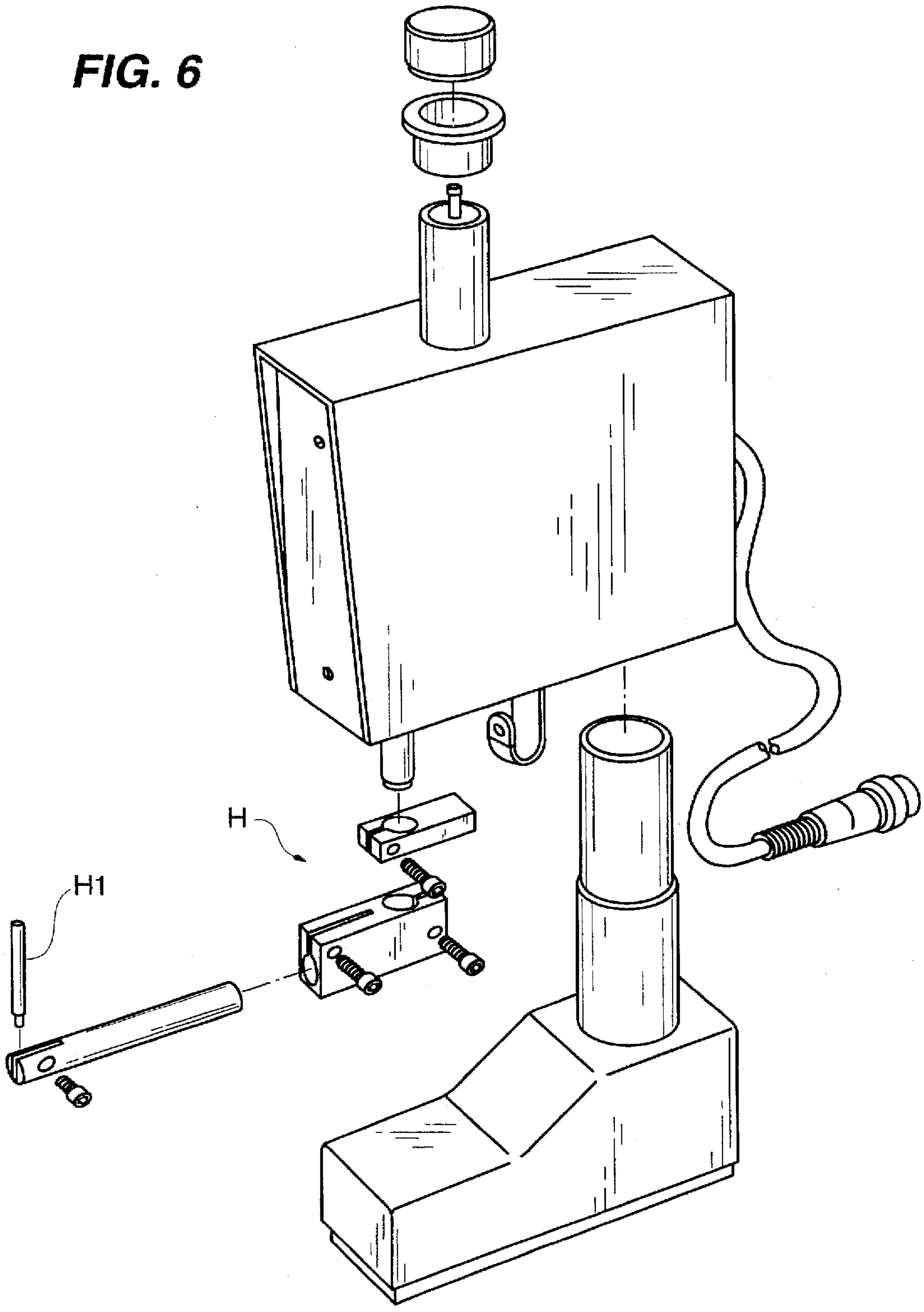
FIG. 6 illustrates perspective view the weld head section of the device assembly apparatus of the present invention.

The method of operation is illustrated in flow diagram form in FIG. 7 and FIG. 6 illustrates a partial side cross-section view of the apparatus. At step 701, the multiconductor cable that is used to form the attached cable, comprising a plurality of conductors enclosed by a sheathing, is prepared by removing the sheathing from a predetermined length of the cable and opening an insulation gap from a predetermined length of each of the now exposed conductors contained within the cable. The wires are pretwisted to a predetermined number of twists per unit length to ensure high quality interconnection of the conductors to the device traces. At step 702, the worker places the device D in the recess formed in anode 33 of the work fixture 10 such that the device traces are each placed in the bottom of a corresponding one of the cuts formed in anode comb 38. The device D can optionally be held in place by the application of a vacuum to the bottom of the recess formed in anode 33 via vacuum aperture 40. A prepared length of the multiconductor cable is then selected by the worker at step 703 and placed into the recess of guide 35 from step 701 such that the exposed ends of the conductors CW1 extend over the corresponding device traces. The worker at step 704 then operates the cable clamp lever 39 to secure the multiconductor cable in position. Once the multiconductor cable is secured in place, the worker at step 705 positions the individual conductors in the bottom of a corresponding one of the cuts formed in anode comb 38 in position over a corresponding device trace. The anode 33 is part of the mechanical and electrical interconnection apparatus which consists of a stack of elements which form the elements to precisely position the cable conductors and pass electric current through the cable conductors to thereby weld them to the contacts of the device.

In order to assist in the precise alignment of the elements, the vision system M is included that can consist of a magnifying lens and user eyepieces to enable the user to directly view the apparatus under assembly and/or a camera C can be used which then displays the resultant image on a display D in enlarged fashion so that the worker can simply view the elements as they are positioned in the fixture W. The fixture itself is mounted on a set of tracks to enable the worker to slide the fixture out from under the vision system and movable head H to thereby have unobstructed access to place the device and the cable conductors into the fixture and, once these elements are placed, reposition the fixture under the movable head H and vision system to verify the accurate positioning of these elements and to mechanically and electrically interconnect the cable conductors to the contacts on the device.

Once all the conductor positioning is completed, at step 706 the worker operates the weld power supply WC to engage the weld head H1 with a selected conductor CW1 in the work fixture 10 to pass the weld current through the conductive path of which the individual cable conductors and the device traces are a part. This weld current welds each individual cable conductor with a corresponding one of the device conductors. The welding operation is accomplished via use of a commercially available welding power supply WC, such as the Model HCD-125 manufactured by Hughes Instrument Company. The welding power supply WC operates by passing a precise amount of energy through the weld head cathode H1 to the work fixture anode 33 through the multiconductor cable individual conductors and associated device traces. The energy level is selected to weld the conductor to the trace, thereby providing both electrical and mechanical interconnection therebetween. The magnitude of the power applied to the weld head cathode H1 is regulated by the welding power supply WC via user adjustable control circuitry (not shown) and the delivery of the power is triggered by the pressure applied by weld head H1 to the work fixture 10. The trigger pressure is set via knob K and as the head H is lowered via operation of foot pedal 9, the weld head cathode H1 comes in contact with the selected conductor CW1 in work fixture 10. Further operation of foot pedal 9 causes the pressure on weld head cathode H1 to build until the predetermined threshold set by knob K is reached, at which time a firing circuit is activated to apply a current through weld head cathode H1 and anode 33. Weld head includes a weld rod typically manufactured from molybdenum carbide and sized to correspond to conductor CW1, while anode 33 is typically manufactured of copper tungsten alloy. The voltage applied to these two elements causes a brief pulse of current to pass through the selected conductor CW1-device trace combination to weld these elements together.

While a single conductor weld operation is described, it is understood that multiple conductors can be simultaneously welded to their respective device traces.

SUMMARY

The electronic device assembly apparatus functions to mechanically position and secure the plurality of conductors in both the cable and the device segment, such that all of the pairs of cable conductor and device conductor can be welded together. The fixture therefore performs all of the cable-device assembly operations and minimizes the human labor required to assemble the cable and device. The use of a single step process reduces the possibility of error and ensures accurate alignment of the work pieces.

While a specific embodiment of the invention has been disclosed, it is expected that alternate embodiments on the invention, which fall within the scope of the appended claims, can be implemented.

We claim:

1. Apparatus for interconnecting a plurality of conductors to a like plurality of electrical contacts comprising:

a weld circuit comprising a first terminal and a second terminal and a power source for applying a current to said first terminal and said second terminal;

means for precisely positioning said plurality of electrical contacts against said first terminal in a spaced apart predetermined orientation;

means for securing each of said plurality of conductors against a mating one of said plurality of electrical contacts which are secured against said first terminal; and means for placing said second terminal in contact with at least one of said plurality of conductors to thereby enable an electrical current, caused by said current, to flow between said first and said second terminals through the at least one conductor and a corresponding one of said electrical contacts to weld said at least one conductor to said mating one of said electrical contacts.

2. The apparatus of claim 1 wherein said precisely positioning means comprises:

an aperture formed in a fixture for receiving an electronic device which is equipped with said plurality of contacts.

3. The apparatus of claim 2 wherein said precisely positioning means further comprises:

optionally, a source of vacuum connected to said aperture to apply a vacuum to said electronic device placed in said aperture to draw said electronic device into said aperture.

4. The apparatus of claim 2 wherein said means for precisely positioning is:

juxtaposed to said aperture, and positions said plurality of conductors in said spaced apart predetermined orientation, such that each of said plurality of conductors is aligned over a mating one of said plurality of electrical contacts placed in said aperture.

5. The apparatus of claim 4 wherein said securing means comprises:

means, located proximate said aperture, for clamping said plurality of conductors to said fixture.

6. The apparatus of claim 4 wherein said positioning means comprises a block having formed therein a plurality of slots, each sized and positioned to receive a one of said plurality of conductors.

7. The apparatus of claim 1 wherein said second terminal comprises:

a weld head comprising at least one electrical terminal sized and positioned to correspond in size and positioning with said one of said plurality of conductors when said one of said plurality of conductors is secured against said mating one of said plurality of electrical contacts.

8. The apparatus of claim 7 further comprising:

means for translating said weld head from a first position removed from said securing means to a second position wherein said electrical terminal contacts a selected one of said plurality of conductors when said selected one of said plurality of conductors are secured against a mating one of said electrical contacts.

9. The apparatus of claim 8 wherein said current automatically discharges through said selected one of said plurality of conductors and said mating one of said plurality of electrical contacts to weld said selected one of said plurality of conductors to said mating one of said plurality of electrical contacts when said translating means positions said weld head into said second position.

10. The apparatus of claim 1 further comprising:

means for moving said securing means and said positioning means in at least one direction parallel to a substantially planar surface on which said securing means and said positioning means are mounted.

* * * * *